United States Patent
Galyas

(10) Patent No.: US 6,687,226 B1
(45) Date of Patent: Feb. 3, 2004

(54) BASE STATION SUBSYSTEM AND METHOD FOR HANDLING AN INCREASE IN TRAFFIC VOLUME THAT OVERLOADS A TERRESTRIAL LINK IN AN INTERNET PROTOCOL NETWORK

(75) Inventor: Peter Galyas, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/283,652

(22) Filed: Apr. 1, 1999

(51) Int. Cl.$^7$ .................. H04L 12/427; H04L 12/42
(52) U.S. Cl. ............... 370/231; 370/229; 370/235; 370/236; 370/352; 370/356; 370/902; 370/912
(58) Field of Search .................. 370/229, 230.1, 370/231, 235, 236, 310, 328, 352, 356, 389, 902, 912, 913

(56) References Cited

U.S. PATENT DOCUMENTS

| | | | |
|---|---|---|---|
| 5,442,625 A | | 8/1995 | Gitlin et al. |
| 5,475,681 A | | 12/1995 | White et al. |
| 5,734,646 A | | 3/1998 | I et al. .................. 370/335 |
| 5,757,772 A | | 5/1998 | Thornberg et al. .......... 370/236 |
| 5,936,940 A | * | 8/1999 | Marin et al. ................ 370/232 |
| 6,058,102 A | * | 5/2000 | Drysdale et al. ............ 370/252 |
| 6,108,782 A | * | 8/2000 | Fletcher et al. ............. 713/153 |

OTHER PUBLICATIONS

Zhimei Jiang and kim Leung. Link–Condition Based Proxies for QoSManagement in Wireless Networks. 2001 IEEE. p. A–61–A67.*
GSM 03.64 Version 6.1.0. Release 1997, Chapters 6.3–6.5, pp. 17–21.
"A Wireless Broadhand Ad–Hoc ATM Local–Area Network" *Wireless Networks*; vol. 1, No. 2, Jul. 1995.
Standard European Search Report dated Oct. 7, 1999.

* cited by examiner

Primary Examiner—Hassan Kizou
Assistant Examiner—Joe Logsdon

(57) ABSTRACT

A base station subsystem (BSS) and method is provided that handles an increase in traffic volume which temporarily overloads at least one terrestrial link in an IP network by gracefully downgrading the transmission rate of one or more calls. More specifically, the BSS includes a base station transmitter (BTS), an IP gateway and an IP network which passes at least one packet based call on a terrestrial link between the BTS and the IP gateway. The BTS and IP gateway each include an end-point having a buffer for measuring a delay in passing the at least one packet based call through the terrestrial link of the IP network and for downgrading a service when the delay as measured by one of the buffers exceeds a predetermined value.

30 Claims, 6 Drawing Sheets

BASE STATION SUBSYSTEM AND METHOD FOR HANDLING AN INCREASE IN TRAFFIC VOLUME THAT OVERLOADS A TERRESTRIAL LINK IN AN INTERNET PROTOCOL NETWORK

BACKGROUND OF THE INVENTION

1. Technical Field of the Invention

The present invention generally relates to the telecommunications field and, in particular, to a Base Station Subsystem (BSS) and method for handling an increase in traffic volume that overloads a terrestrial link in an Internet Protocol (IP) network.

2. Description of Related Art

The BSSs currently available for use in a wireless communications network may support both circuit switched transmissions and packet switched transmissions. The circuit switched transmissions and packet switched transmissions can be transmitted according to the Global System for Mobile Communications (GSM) standard, for example. More specifically, the packet switched transmissions can be transmitted according to the General Packet Radio Service (GPRS). And, the circuit switched transmissions can be transmitted according to the Adaptive Multi-Rate (AMR) standard.

To accommodate the increased and variable bandwidth associated with packet switched transmissions, the introduction of an IP network into the BSS has been proposed. The introduction of the IP network into the BSS referred to herein as an "IP based BSS" increases the flexibility and transmission efficiency of the communications network by enabling the use of statistical multiplexing. Unfortunately, not all of the Quality of Service (QoS) issues associated with mobile service are currently addressed by a network operator when dimensioning the IP based BSS.

To properly dimension the IP based BSS requires that the network operator take into account several aspects including (for example): (1) statistical behaviors of a source and service; (2) real-time requirements (e.g., sensitivity to delay and delay variations); (3) QoS issues; (4) network topology (e.g., redundant routes, trunking gains in grooming points); and (5) traffic distribution. Of course, the network operator when dimensioning the IP based BSS utilizes statistical models that include some extra margin to account for future growth. However, in view of the ever increasing demand for cellular communications the statistical models are likely to be under dimensioned, and as such may not effectively handle situations where traffic volume temporarily exceeds the initial dimensioning parameters.

During such situations, when terrestrial links in the IP network are overloaded, the current QoS priority mandates that some calls are to be disconnected in either a controlled or uncontrolled manner. However, the disconnection of any ongoing call is not acceptable to most subscribers. Accordingly, there is a need for a communications system and method capable of effectively handling a situation where an increase in traffic volume temporarily overloads the terrestrial links in the IP based BSS.

BRIEF DESCRIPTION OF THE INVENTION

The present invention is directed to a base station subsystem (BSS) and method that effectively handles an increase in traffic volume which temporarily overloads at least one terrestrial link in an Internet Protocol (IP) network by gracefully downgrading a transmission rate of one or more calls. More specifically, the BSS preferably includes a base station transceiver (BTS), an IP gateway, and an IP network that passes at least one packet based call through a terrestrial link between the BTS and the IP gateway. The BTS and IP gateway each include an end-point having a buffer for measuring a delay in passing the at least one packet based call through the terrestrial link of the IP network and for downgrading a service when the delay as measured by one of the buffers exceeds a predetermined value.

In accordance with the present invention, there is provided a BSS and method that handles temporary overload situations within an IP domain by gracefully degrading the transmission rate of a call which, in turn, increases the robustness of a communications system.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
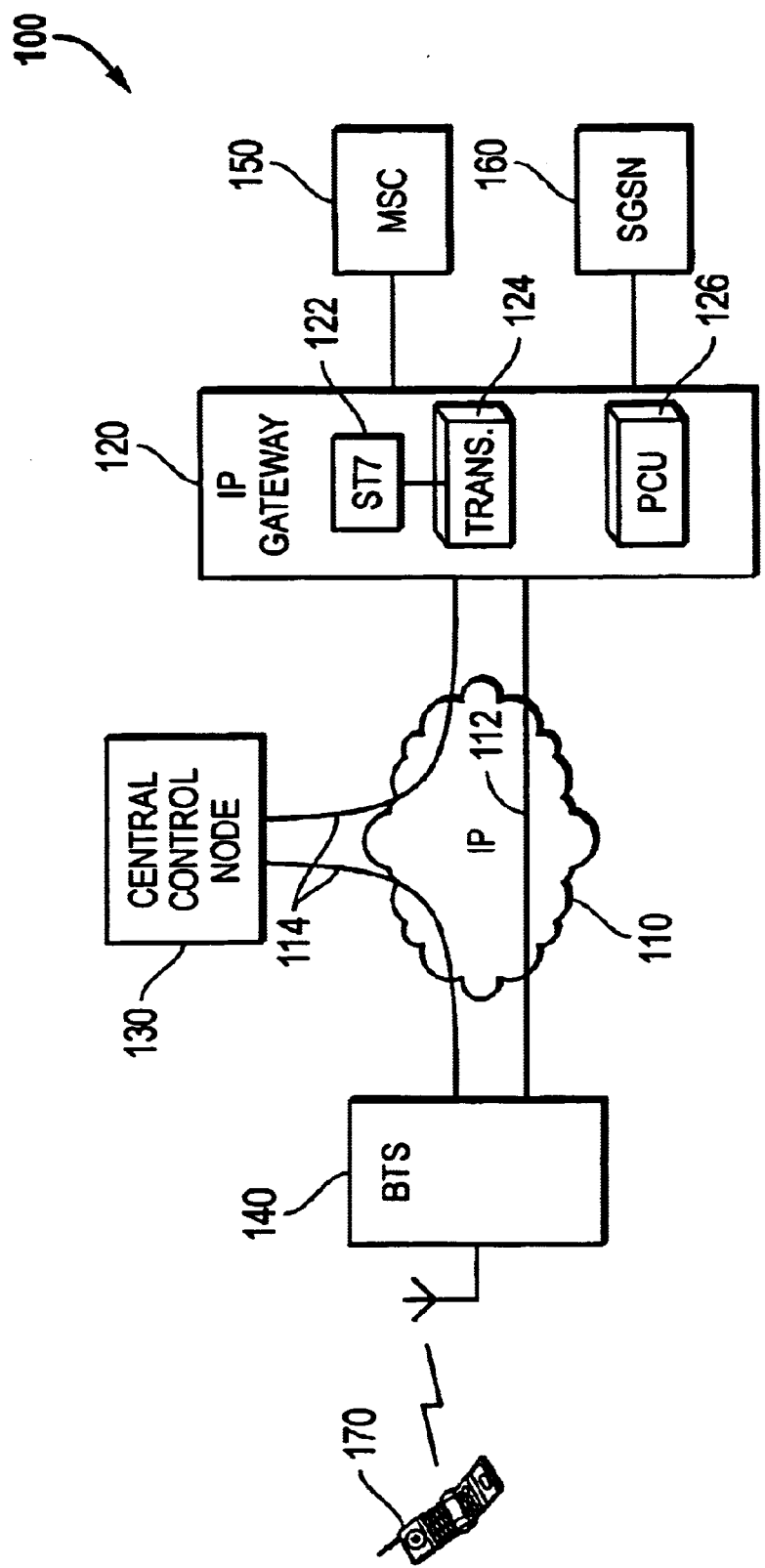
FIG. 1 is a block diagram illustrating the basic architecture of an IP based BSS which can be used to implement the present invention.

Referring to the Drawings, wherein like numerals represent like parts throughout FIGS. 1–6, there are disclosed four embodiments of an exemplary IP based BSS 100 and a preferred method 200 in accordance with the present invention.

Although the IP based BSS 100 will be described with reference to the GPRS and AMR standards, those skilled in the art appreciate that other standards and specifications may also utilize the principles of the present invention especially if they support packet based transmissions. Accordingly, the IP based BSS 100 described should not be construed in such a limited manner.

Figure 2:
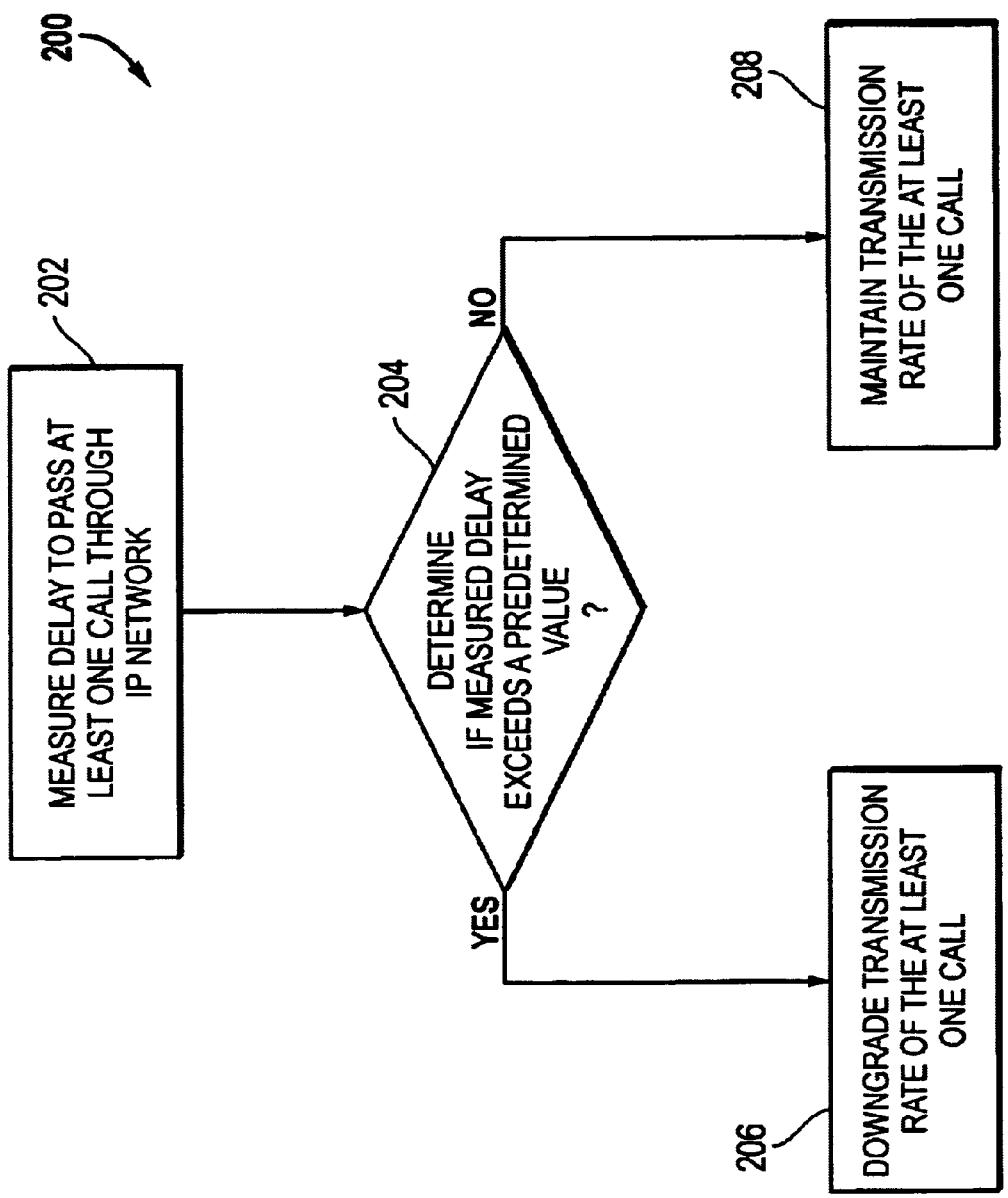
FIG. 2 is a simplified flowchart illustrating the steps of a preferred method of the present invention.

Referring to FIGS. 1 and 2, there are illustrated the basic architecture of the IP based BSS 100 (FIG. 1) and the steps of the preferred method 200 (FIG. 2) in accordance with the present invention. Certain details associated with the IP based BSS 100 are known and as such need not be described herein. Therefore, for clarity, the description provided below in relation to the IP based BSS 100 omits some components which are not needed to understand the invention.

Basically, the IP based BSS 100 operates to address a situation within an IP network 110 where a terrestrial link 112 is overloaded by gracefully degrading a transmission rate of at least one call. More specifically, the IP based BSS 100 and method 200 operate to measure (step 202) a delay in passing the at least one call through the terrestrial link 112, and determining (step 204) if the measured delay exceeds a predetermined value. In response to an affirmative answer, the IP based BSS 100 and method 200 operate to downgrade (step 206) the transmission rate of the at least one call to accommodate the overloaded terrestrial link 112. Otherwise, the IP based BSS 100 and method 200 operate to maintain (step 208) the transmission rate of the at least one call.

The IP based BSS 100 includes an IP gateway 120, a central control node 130 and a base station transmitter (BTS) 140 each coupled to the IP network 110 by terrestrial link(s) 112 (e.g., payload link(s)) and/or signalling link(s) 114. The IP gateway 120 (e.g., interface unit) includes a signalling terminal #7 (ST7) 122 and at least one transcoder 124 collectively used to convert between IP based transmissions and circuit switched transmissions including speech and data received from or transmitted to a mobile switching center (MSC) 150. In addition, the IP gateway 120 includes at least one packet control unit (PCU) 126 used to convert between IP based transmissions and packet switched transmissions including data received from or transmitted to a serving general packet radio service support node (SGSN) 160. The PCU 126 also prioritizes which one of two users that send a communication at the same time will be given priority. In addition, the PCU 120 also handles a Radio Link Control (RLC) protocol which controls logical signalling channels and link adaption.

The central control node 120 (e.g., base station controller, resource server or gatekeeper in H.323) manages the IP network 110, the IP gateway 120 and the BTS 130 to provide mobile service to a mobile terminal 170 or data terminal equipment (not shown). The mobile terminal 170 communicates with the BTS 130 over an air interface. A more detailed description as to how the IP based BSS 100 addresses the overloaded terrestrial link 112 within the IP network 110 is provided below with respect to FIGS. 3–6.

Referring to FIGS. 3–6, there are shown the four embodiments of the IP based BSS 100 each illustrated in the form of a transmission model. Each transmission model has several layers including, for example, application layers 302, session layers (UDP) 304, network layers 306 (IP), link layers 308 and physical layers 310 which are known and as such need not be described in detail herein.

As mentioned earlier, the IP network 110 generally operates to pass at least one packet based call between the BTS 130 and the IP gateway 120 for transmission to or reception from the mobile terminal 170 (only one shown). However, when the terrestrial link 112 of IP network 110 is overloaded so as to delay traffic then the conventional QoS priority mandates that some packet based calls be disconnected in either a controlled or uncontrolled manner. This problematic overload situation is addressed by each embodiment (described below) of the present invention in a slightly different manner depending on the type of speech codecs (e.g., AMR or GPRS) used and whether the delay is caused by a downlink overload or an uplink overload.

Figure 3:
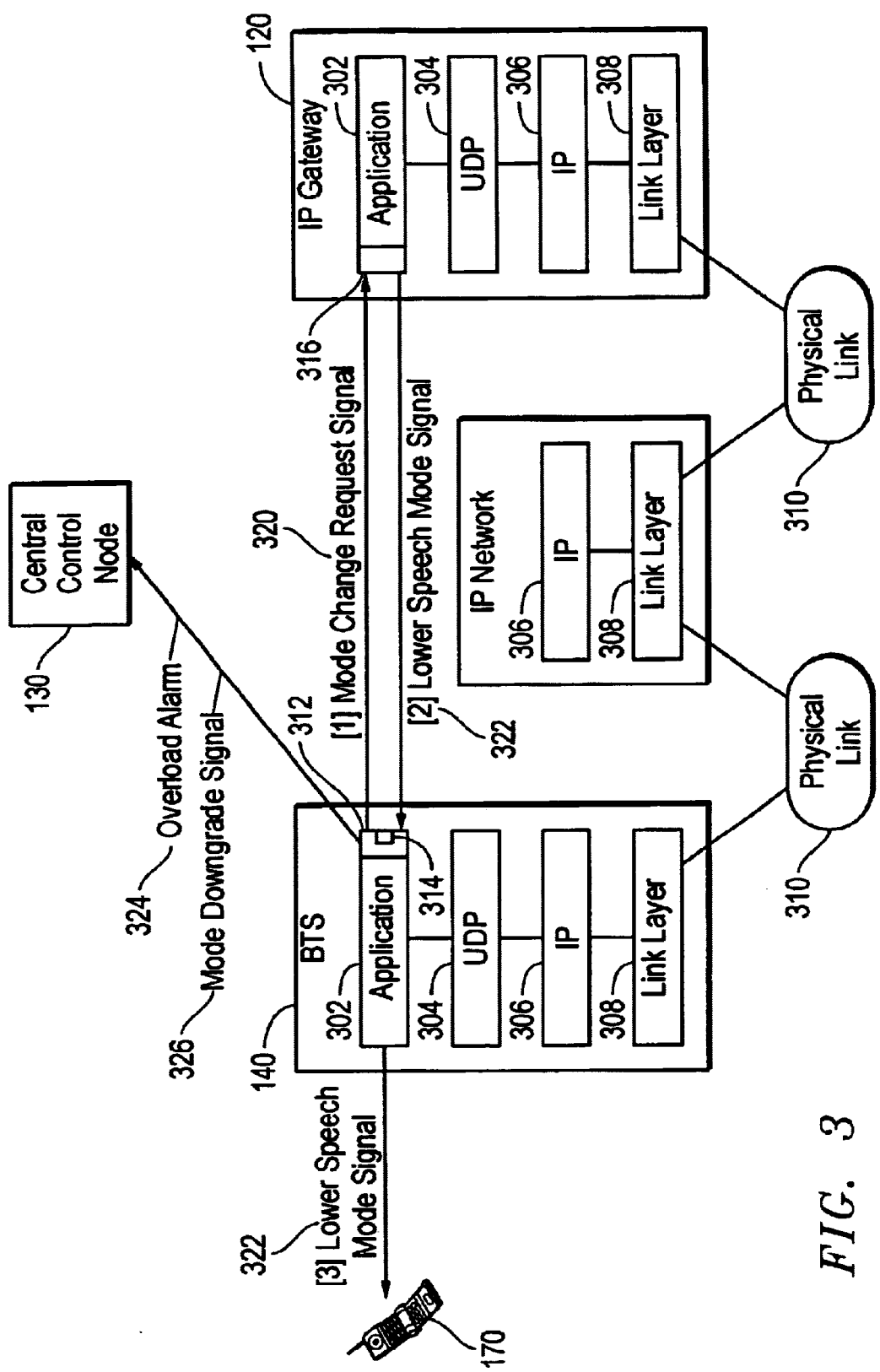
FIG. 3 is a block diagram illustrating a first embodiment of the present invention where the IP based BSS operable in accordance with an AMR standard addresses a downlink overload in an IP network.

Referring specifically to FIG. 3, there is illustrated the first embodiment of the present invention where the IP based BSS 100 operable in accordance with the AMR standard addresses a downlink overload in the IP network 110.

In the first embodiment, the BTS 140 includes an endpoint 312 having a buffer 314 located within the application level 302. The buffer 314 (described in greater detail below) operates to monitor the delay in passing packet based call(s) through one of the terrestrial links 112 (see FIG. 1) in the IP network 110. And, when the delay as measured by the buffer 314 exceeds a predetermined value then the transmission rate (e.g., service speech bit-rate) of one or more of the packet based calls on the terrestrial link 112 is downgraded to accommodate the downlink overload instead of disconnecting the call(s). The predetermined value can be, for example, a value corresponding to a QoS requirement or a value corresponding to the size of the buffer 314.

To downgrade the transmission rate of the packet based call(s) within the IP network 110, the end-point 312 of the BTS 140 operates to send a mode change request signal 320 (e.g., inband control message) to an end-point 316 located in the application layer 302 of the IP gateway 120. In response to the mode change request signal 320, the IP gateway 120 sends a lower speech mode signal 322 to the BTS 140 which forwards the lower speech mode request signal to the mobile terminal 170. The mobile terminal 170 and the IP based BSS 100 then communicate using a lower speech bit-rate and higher channel coding bit-rate. By lowering the speech bit-rate, the delay caused by the downlink overload within the terrestrial link(s) 112 of the IP network 110 is addressed without requiring the immediate disconnection of the call(s).

The control signalling (e.g., mode change request signal 320 and lower speech mode signal 322) is generally conducted between the end-points 312 and 316 without passing through the central control node 130. Because, the idea is to use adaptation mechanisms within the application layers 302 of the IP gateway 120 and BTS 140 to address temporary overload situations within the terrestrial IP network 110. However, the central control node 130 could be informed by the use of an overload alarm 324 and a mode downgrade signal 326 sent directly from the end-point 312. Alternatively, the central control node 130 could be informed by routing the control signalling 120 through the central control node (not shown).

Figure 4:
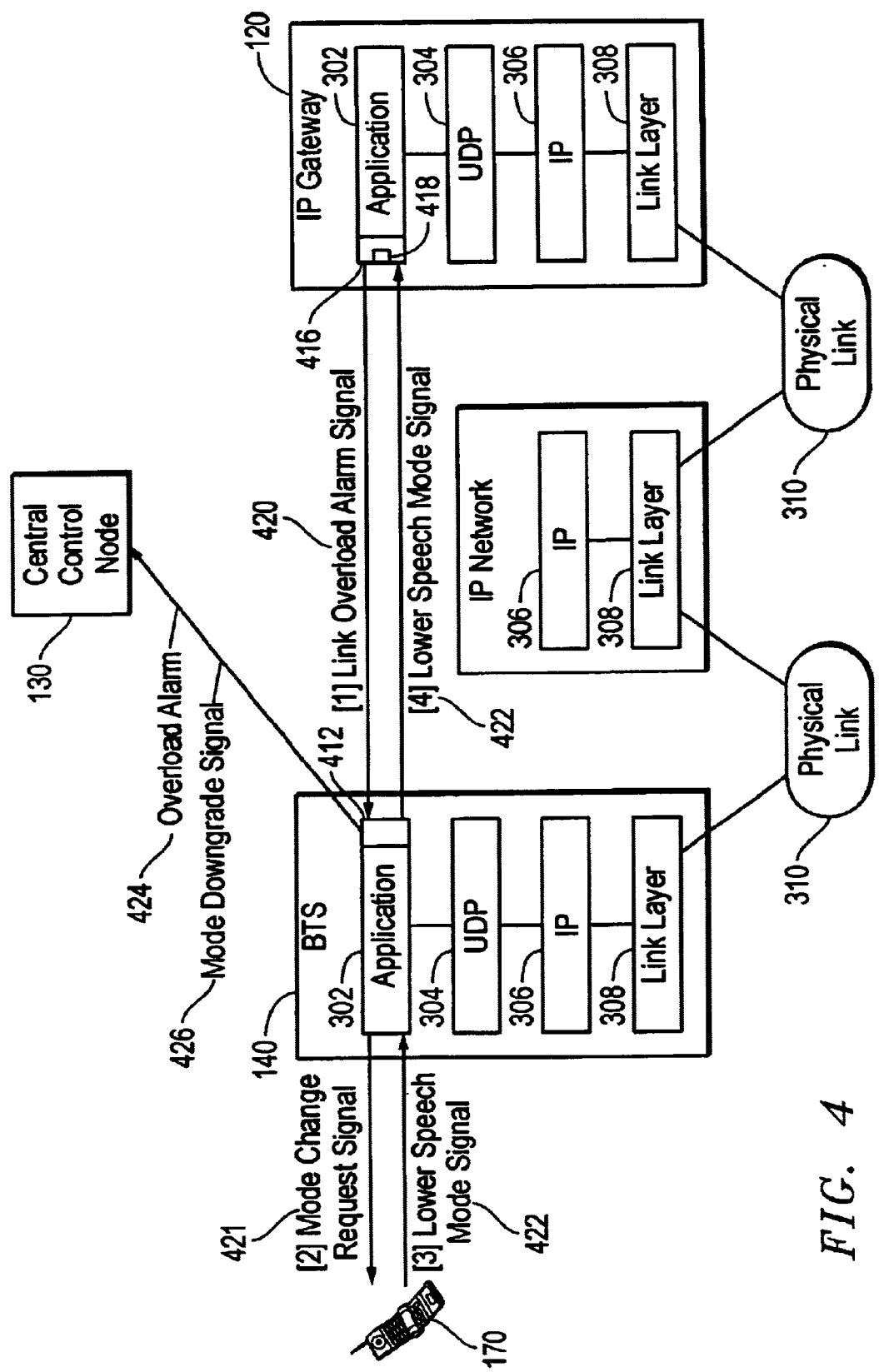
FIG. 4 is a block diagram illustrating a second embodiment of the present invention where the IP based BSS operable in accordance with the AMR standard addresses an uplink overload in the IP network.

Referring specifically to FIG. 4, there is illustrated the second embodiment of the present invention where the IP based BSS 100 operable in accordance with the AMR standard addresses an uplink overload in the IP network 110.

In the second embodiment, the IP gateway 120 includes an end-point 416 having a buffer 418 located within the application level 302. The buffer 418 (described in greater detail below) operates to monitor the delay in passing packet based call(s) through one of the terrestrial links 112 (see FIG. 1) in the IP network 110. And, when the delay as measured by the buffer 418 exceeds a predetermined value then the transmission rate (e.g., service speech bit-rate) of one or more of the packet based calls on the terrestrial link 112 is downgraded to accommodate the uplink overload instead of disconnecting the call(s). The predetermined value can be, for example, a value corresponding to a QoS requirement or a value corresponding to the size of the buffer 418.

To downgrade the transmission rate of the packet based call(s) within the IP network 110, the end-point 416 of the IP gateway 120 operates to send a link overload alarm signal 420 (e.g., inband control message) to an end-point 412 located in the application layer 302 of the BTS 140. In response to the link overload alarm signal 420, the BTS 140 sends a mode change request signal 421 (e.g., inband control message) to the mobile terminal 170 which returns a lower speech mode signal 422 to the BTS 140. The BTS 140 then forwards the lower speech mode signal 422 to the IP gateway 120. The mobile terminal 170 and the IP based BSS 100 then communicate using a lower speech bit-rate and higher channel coding bit-rate. By lowering the speech bit-rate, the delay caused by the uplink overload within the terrestrial link(s) 112 of the IP network 110 is addressed without requiring the immediate disconnection of the call(s).

The control signalling (e.g., link overload alarm 420 and the lower speech mode signal 422) is generally conducted between the end-points 412 and 416 without passing through the central control node 130. Because, the idea is to use adaptation mechanisms within the application layers 302 of the IP gateway 120 and BTS 140 to address temporary overload situations within the terrestrial IP network 110. However, the central control node 130 could be informed by the use of an overload alarm 424 and a mode downgrade signal 426 sent directly from the end-point 412. Alternatively, the central control node 130 could be informed by routing the control signalling through the central control node (not shown).

It should be understood that in the case of a congested IP network 110, it may be difficult to get the inband control signalling therethrough, especially if the IP network supports "best effort" and the end-point 314 or 418 detects the particular overload when the buffers in the routers are already full. For the "best effort" type of IP network 110, one may attempt to trigger the downgrading before the buffers are overfull. Also, when using Differentiated Services within the IP network 110, the possibility exists to define the control signalling with a higher drop priority than the rest of the traffic. This makes it possible to pass the signalling even though the buffers in the highest delay priority queue are overfull. The Differentiated Services makes use of a DS-field (also known as a ToS field) in an IP header where either the same IP address and port could be used for both payload and signalling. And, in this case, the application should be able to determine the DS-field differently depending on the type of payload. In the alternative, one can use a different port for signalling and configure that port to set the DS-field to "drop sensitive."

Figure 5:
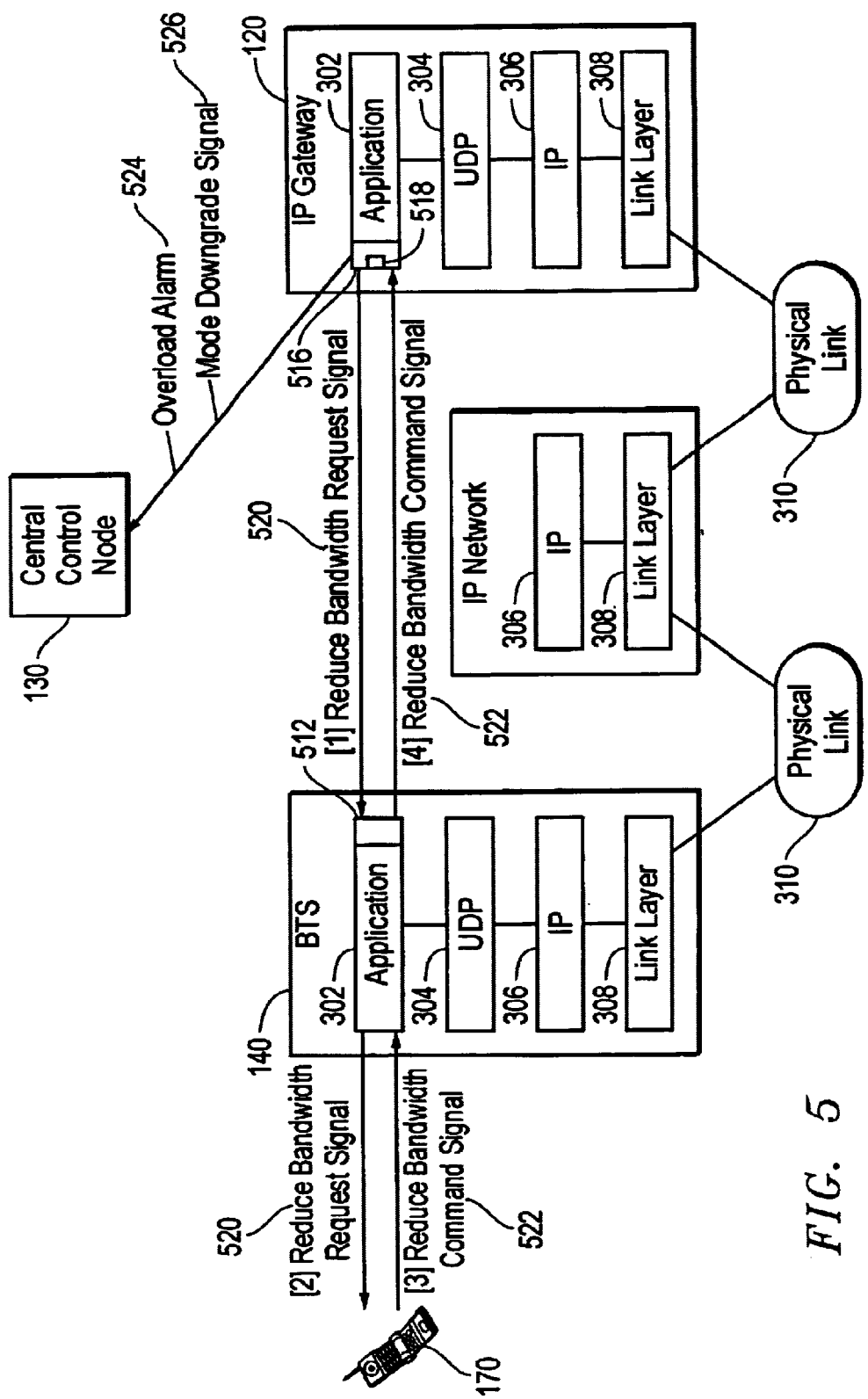
FIG. 5 is a block diagram illustrating a third embodiment of the present invention where the IP based BSS operable in accordance with a GPRS standard addresses an uplink overload in the IP network.

Referring specifically to FIG. 5, there is illustrated the third embodiment of the present invention where the IP based BSS 100 operable in accordance with the GPRS standard addresses an uplink overload in the IP network 110.

In the third embodiment, the IP gateway 120 includes an end-point 516 having a buffer 518 located within the application level 302. The buffer 518 (described in greater detail below) operates to monitor the delay in passing packet based call(s) through one of the terrestrial links 112 (see FIG. 1) in the IP network 110. And, when the delay as measured by the buffer 518 exceeds a predetermined value then the transmission rate (e.g., service bandwidth) of one or more of the packet based calls on the terrestrial link is downgraded to accommodate the uplink overload instead of disconnecting the call(s). The predetermined value can be a value corresponding to a Qos requirement or a value corresponding to the size of the buffer 518.

To downgrade the transmission rate of the packet based call(s) within the IP network 110, the end-point 518 of the IP gateway 120 operates to send a reduce bandwidth request signal 520 (e.g., inband MAC/RLC scheduling) to an end-point 512 located in the application layer 302 of the BTS 140. In response to the reduce bandwidth request signal 520, the BTS 140 forwards the reduce bandwidth request signal to the mobile terminal 170 which returns a reduce bandwidth command signal 522 to the BTS 140. The BTS 140 then forwards the reduce bandwidth command signal 522 to the IP gateway 120. The mobile terminal 170 and the IP based BSS 100 then communicate with each other using a service transmission rate having a lower bandwidth. By downgrading the bandwidth, the delay caused by the uplink overload within the terrestrial link(s) 112 of the IP network 110 is addressed without requiring the immediate disconnection of the call(s).

The control signalling (e.g., the reduce bandwidth request signal 520 and reduce bandwidth command signal 522) is generally conducted between the end-points 512 and 516 without passing through the central control node 130. Because, the idea is to use adaptation mechanisms within the application layers 302 of the IP gateway 120 and BTS 140 to address temporary overload situations within the terrestrial IP network 110. However, the central control node 130 could be informed by the use of an overload alarm 524 and a mode downgrade signal 526 sent directly from the end-point 516. Alternatively, the central control node 130 could be informed by routing the control signalling through the central control node (not shown).

Figure 6:
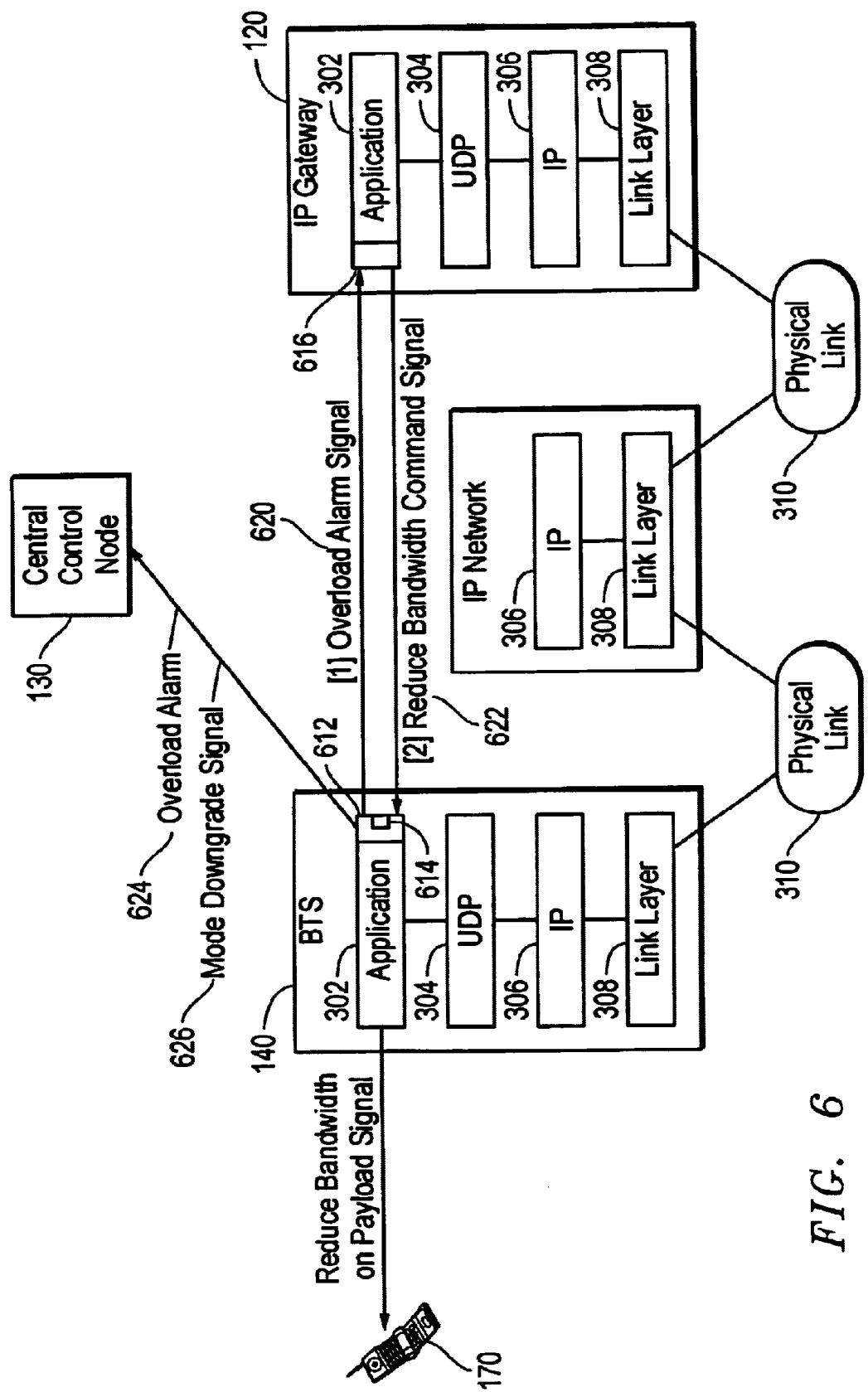
FIG. 6 is a block diagram illustrating a fourth embodiment of the present invention where the IP based BSS operable in accordance with the GPRS standard addresses a downlink overload in the IP network.

Referring specifically to FIG. 6, there is illustrated the fourth embodiment of the present invention where the IP based BSS 100 operable in accordance with the GPRS standard addresses a downlink overload in the IP network 110.

In the fourth embodiment, the BTS 140 includes an end-point 612 having a buffer 614 located within the application level 302. The buffer 614 (described in greater detail below) operates to monitor the delay in passing packet based call(s) through one of the terrestrial links 112 (see FIG. 1) in the IP network 110. And, when the delay as measured by the buffer 614 exceeds a predetermined value then the transmission rate (e.g., service bandwidth) of one or more of the packet based calls on the terrestrial link is downgraded to accommodate the downlink overload instead of disconnecting the call(s). The predetermined value can be a value corresponding to a QOS requirement or a value corresponding to the size of the buffer 518.

To downgrade the transmission rate of the packet based call(s) within the IP network 110, the end-point 612 of the BTS 140 operates to send an overload alarm signal 620 (e.g., inband control message) to an end-point 616 located in the application layer 307 of the IP gateway 120. In response to the overload alarm signal 620, the IP gateway 120 forwards a reduce bandwidth command signal 622 to the BTS 140. The BTS 140 then controls a channel coding to reduce the bandwidth of the payload to the mobile terminal 120 by choosing, for example, a "too robust" channel code. The mobile terminal 170 and the IP based BSS 100 then communicate with each other using a service transmission rate having a lower bandwidth. By downgrading the bandwidth, the delay caused by the downlink overload within the terrestrial link(s) 112 of the IP network 110 is addressed without requiring the immediate disconnection of the call(s).

The control signalling (e.g., the link overload alarm signal 620 and reduce bandwidth command signal 622) is generally conducted between the end-points 612 and 616 without passing through the central control node 130. Because, the idea is to use adaptation mechanisms within the application layers 302 of the IP gateway 120 and BTS 140 to address temporary overload situations within the terrestrial IP network 110. However, the central control node 130 could be informed by the use of an overload alarm 624 and a mode downgrade signal 626 sent directly from the end-point 612.

Alternatively, the central control node 130 could be informed by routing the control signalling through the central control node (not shown).

Referring to the third and fourth embodiments, it should be understood that the reduction of the bandwidth for GPRS differs from AMR in the way the PCU 126 has control over what channel coding the BTS 140 utilizes to adapt to variable radio conditions. In other words, the BTS 140 also controls the bandwidth in the downlink direction and when the BTS detects an overload situation and informs the PCU, the PCU could reduce the bandwidth itself by using a stronger channel coding (added in the BTS) than actually needed from a radio channel point of view. Such a reduction means that the transmission over the radio is more robust which, in turn, reduces the need for re-transmission of the same information (ARQ is mostly used).

Moreover, this also leads to a reduction in bandwidth on the payload signal to the mobile terminal 170. For example, in the uplink direction, the PCU 126 detects the overload situation and commands the mobile terminal 170 that wants to send data to use a stronger channel coding than what is needed to reduce the payload sent over the radio interface as well as over the terrestrial links. Therefore, for GPRS, the effect will be a longer delay to send the data; while in the speech case (AMR), the effect is a reduced bitrate for the speech coder resulting in slightly lower speech quality while maintaining an acceptable delay.

With reference to all four embodiments, there are several ways for using buffers 314, 410, 518, or 614 to detect an overload in the IP network. For example, a buffer generally handles a jitter compensation for packets received with different delays through the IP network 110. However, the amount of data buffered does not entirely correspond with the absolute delay. For example, networks with a low load can introduce a little jitter resulting in a low delay. It will also be the same with highly loaded networks with a stable load but with one difference in that the delay through the buffers in the routers will be much more. Thus, an adaptive jitter buffering algorithm attempts to reduce the delay while adapting for the jitter trying to avoid the dropping of packets due to late arrival. The actual depth of the jitter buffer reflects the present jitter over the network for this call.

There are several ways to set a threshold for an acceptable delay that corresponds to a required QoS priority. For instance, if the threshold is less than the extra buffering capacity in the routers, then the Graceful Degradation procedure of the present invention could be triggered before the buffers in the routers are flooded and thus avoid throwing away packets. On the other side, if the threshold is more than the buffering capacity in the routers, then packets are being lost, which is an indication of an overloaded network. A counter could be added for detection of lost packets, and active measurements, such as ping, could also be used to detect lost packets. Also, an absolute measurement could be achieved by using a method for distributing global time within the IP network.

It should also be understood that the end-points for all of the above-described embodiments are not equal to an end user such as is the case with traditional Internet applications. And, that the control center node 130 may operate to disconnect the call(s) when the present invention does not effectively handle the overload situation within the IP network 110 by gracefully downgrading the service performance.

From the foregoing, it can be readily appreciated by those skilled in the art that the present invention provides a method and BSS for handling an increase in traffic volume that temporarily overloads at least one terrestrial link in an IP network by gracefully downgrading the transmission rate of one or more calls.

Although several embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A base station subsystem comprising:
    a transmitter;
    an interface unit;
    a packet switched network for passing information between said transmitter and said interface unit; and
    said transmitter and said interface unit each including an end-point for measuring a delay in passing the information through a link in said packet switched network and downgrading a service when the delay as measured by at least one of the end-points exceeds a predetermined value.

2. The base station subsystem of claim 1, further comprising a central control node operatively connected to said transmitter, said interface unit and said packet switched network.

3. The base station subsystem of claim 2, wherein each end-point further includes means for informing said central control node when the measured delay exceeds the predetermined value and the service has been downgraded by routing control signalling between said end-points through said central control node.

4. The base station subsystem of claim 2, wherein each end-point further includes means for informing said central control node when the measured delay exceeds the predetermined value and the service has been downgraded by forwarding distinct messages to said central control node.

5. The base station subsystem of claim 2, wherein said central control node further includes means for disconnecting the information passing through the packet switched network.

6. The base station subsystem of claim 1, wherein said information further includes at least one packet based call.

7. The base station subsystem of claim 1, wherein said downgraded service further includes a downgraded speech mode or a downgraded bandwidth.

8. The base station subsystem of claim 1, wherein said delay further includes a downlink overload delay or an uplink overload delay.

9. The base station subsystem of claim 1, wherein said predetermined value of the delay further includes a value corresponding to a quality of service requirement or a size of a buffer located within one of said end-points.

10. The base station subsystem of claim 1, wherein said transmitter further includes a base station transmitter.

11. The base station subsystem of claim 1, wherein said interface unit further includes an Internet Protocol Gateway.

12. A cellular communications system capable of handling an overload situation within a terrestrial link, said cellular communications system comprising:
    a transmitter for communicating at least one packet based call over an air interface with a mobile phone;
    an interface unit;
    an Internet Protocol network for passing the at least one packet based call over the terrestrial link between said transmitter and said interface unit; and said transmitter and said interface unit each including an end-point for measuring a delay in passing said at least one packet based call through the terrestrial link in said Internet Protocol network and when the delay as measured by one of the end-points exceeds a predetermined value, then downgrading a transmission rate associated with said at least one packet based call to handle the overload situation.

13. The cellular communications system of claim 12, further comprising a central control node operatively connected to said transmitter, said interface unit and said Internet Protocol network.

14. The cellular communications system of claim 13, wherein each end-point further includes means for informing said central control node when the measured delay exceeds the predetermined value and the transmission rate was downgraded by routing control signalling between said end-points through said central control node.

15. The cellular communications system of claim 13, wherein each end-point further includes means for informing said central control node when the measured delay exceeds the predetermined value and the transmission rate was downgraded by forwarding distinct messages to said central control node.

16. The cellular communications system of claim 12, wherein said at least one packet based call is configured in accordance with an Adaptive Multi-Rate Speech codec and said delay as measured by a buffer located in said transmitter further includes a downlink overload delay exceeding the predetermined value.

17. The cellular communications system of claim 16, wherein:
said transmitter further includes means for sending a mode change request signal to said interface unit;
said interface unit further includes means for sending a lower speech mode signal to said transmitter; and
said transmitter further includes means for sending the lower speech mode signal to said mobile phone.

18. The cellular communications system of claim 12, wherein said at least one packet based call is configured in accordance with an Adaptive Multi-Rate Speech codec and said delay as measured by a buffer located in said interface unit further includes an uplink overload delay exceeding the predetermined value.

19. The cellular communications system of claim 18, wherein:
said interface unit further includes means for sending an overload alarm signal to said transmitter;
said transmitter further includes means for sending a mode change request signal to said mobile phone;
said mobile phone further includes means for sending a lower speech mode signal to said transmitter; and
said transmitter further includes means for sending the lower speech mode signal to said interface unit.

20. The cellular communications system of claim 12, wherein said at least one packet based call is configured in accordance with a General Packet Radio Service codec and said delay as measured by a buffer located in said interface unit further includes an uplink overload delay exceeding the predetermined value.

21. The cellular communications system of claim 20, wherein:
said interface unit further includes means for sending a reduce bandwidth request signal to said transmitter;
said transmitter further includes means for sending the reduce bandwidth request signal to said mobile phone;
said mobile phone further includes means for sending a reduce bandwidth command signal to said transmitter; and
said transmitter further includes means for sending the reduce bandwidth command signal to said interface unit.

22. The cellular communications system of claim 12, wherein said at least one packet based call is configured in accordance with a General Packet Radio Service codec and said delay as measured by a buffer located in said transmitter further includes a downlink overload delay exceeding the predetermined value.

23. The cellular communications system of claim 22, wherein:
said transmitter further includes means for sending an overload alarm signal to said interface unit;
said interface unit further includes means for sending a reduce bandwidth command signal to said transmitter; and
said transmitter further includes means for reducing bandwidth of payload signal to said mobile phone.

24. A method for handling an overload situation within an Internet Protocol network included within a base station subsystem of a cellular communications system, said method comprising the steps of:
measuring a delay in passing at least one call through a terrestrial link between a transmitter and an interface unit of said Internet Protocol network at an endpoint in either the transmitter or the interface unit;
determining at the endpoint when the measured delay exceeds a predetermined value; and
downgrading at the endpoint, in response to an affirmative determination, a transmission rate associated with said at least one call to address the overload situation resulting from the delay within said Internet Protocol network.

25. The method of claim 24, further comprising the step of informing a central control node when the measured delay exceeds the predetermined value.

26. The method of claim 25, wherein said predetermined value further includes a value corresponding to a quality of service requirement or a size of a buffer.

27. The method of claim 24, wherein said at least one call is configured in accordance with an Adaptive Multi-Rate Speech codec and said delay as measured by the endpoint in the transmitter of the base station subsystem further includes a downlink overload delay exceeding the predetermined value, said step of downgrading further includes:
sending a mode change request signal from said transmitter to an interface unit of the base station subsystem;
sending a lower speech mode signal from said interface unit to said transmitter; and
sending the lower speech mode signal from said transmitter to a mobile phone.

28. The method of claim 24, wherein said at least one call is configured in accordance with an Adaptive Multi-Rate Speech codec and said delay as measured by the endpoint in the interface unit of the base station subsystem further includes an uplink overload delay exceeding the predetermined value, said step of downgrading further includes:
sending an overload alarm signal from said interface unit to a transmitter of the base station subsystem;
sending a mode change request signal from said transmitter to a mobile phone;
sending a lower speech mode signal from said mobile phone to said transmitter; and sending the lower speech mode signal from said transmitter to said interface unit.

29. The method of claim 24, wherein said at least one call is configured in accordance with a General Packet Radio Service codec and said delay as measured by the endpoint in the interface unit of the base station subsystem further includes an uplink overload delay exceeding the predetermined value, said step of downgrading further includes:

sending a reduce bandwidth request signal from said interface unit to a transmitter of the base station subsystem;

sending the reduce bandwidth request signal from said transmitter to a mobile phone;

sending a reduce bandwidth command signal from said mobile phone to said transmitter; and sending the reduce bandwidth command signal from said transmitter to said interface unit.

30. The method of claim 24, wherein said at least one call is configured in accordance with a General Packet Radio Service codec and said delay as measured the endpoint in the transmitter of the base station subsystem further includes a downlink overload delay exceeding the predetermined value, said step of downgrading further includes:

sending an overload alarm signal from said transmitter to an interface unit of the base station subsystem;

sending a reduce bandwidth command signal from said interface unit to said transmitter; and reducing bandwidth of payload signal from said transmitter to a mobile phone.

* * * * *